(12) United States Patent
Westland (10) Patent No.: US 11,316,691 B2
(45) Date of Patent: Apr. 26, 2022

(54) METHODS AND SYSTEMS FOR ENHANCING NETWORK PRIVACY OF MULTIPLE PARTY DOCUMENTS ON DISTRIBUTED LEDGER-BASED NETWORKS

(71) Applicant: EYGS LLP, London (GB)

(72) Inventor: Duncan James Westland, Addlestone (GB)

(*) Notice: Subject to any disclaimer, the term of this patent is extended or adjusted under 35 U.S.C. 154(b) by 86 days.

(21) Appl. No.: 16/848,269

(22) Filed: Apr. 14, 2020

(65) Prior Publication Data

US 2020/0328893 A1    Oct. 15, 2020

Related U.S. Application Data

(60) Provisional application No. 62/834,254, filed on Apr. 15, 2019.

(51) Int. Cl.
*H04L 9/32* (2006.01)
*H04L 9/30* (2006.01)

(52) U.S. Cl.
CPC .............. *H04L 9/3218* (2013.01); *H04L 9/30* (2013.01); *H04L 9/3236* (2013.01); *H04L 2209/38* (2013.01)

(58) Field of Classification Search
CPC ....... H04L 9/3218; H04L 9/30; H04L 9/3236; H04L 2209/38; H04L 2209/42; H04L 9/3239; H04L 63/123; H04L 2209/56
See application file for complete search history.

(56) References Cited

U.S. PATENT DOCUMENTS

| | | |
|---|---|---|
| 5,892,900 A | 4/1999 | Ginter et al. |
| 7,574,383 B1 | 8/2009 | Parasnis et al. |
| 9,397,985 B1 | 7/2016 | Seger, II et al. |
| 9,608,829 B2 | 3/2017 | Spanos et al. |
| 9,785,369 B1 | 10/2017 | Ateniese et al. |
| 9,794,074 B2 | 10/2017 | Toll et al. |
| 9,870,508 B1 | 1/2018 | Hodgson et al. |
| 9,881,176 B2 | 1/2018 | Goldfarb et al. |
| 9,906,513 B2 | 2/2018 | Wuehler |

(Continued)

FOREIGN PATENT DOCUMENTS

| | | |
|---|---|---|
| CN | 107274184 A | 10/2017 |
| CN | 110033377 A | 7/2019 |

(Continued)

OTHER PUBLICATIONS

International Search Report and Written Opinion for International Application No. PCT/US2019/056646, dated Jan. 15, 2020, 12 pages.

(Continued)

*Primary Examiner* — Baotran N To
(74) *Attorney, Agent, or Firm* — Cooley LLP (57) ABSTRACT

Embodiments of the instant disclosure include methods and systems directed at providing enhanced security and privacy to multiple party communications that occur on zero knowledge proof (ZKP)-enabled distributed ledger-based networks (DLNs). In particular, the methods and systems include subject matter related to the deployment, and approval, of a multi-party document or instrument for consideration and approval by multiple participants of the DLN.

20 Claims, 3 Drawing Sheets

(56) References Cited

U.S. PATENT DOCUMENTS

| | | | |
|---|---|---|---|
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 10,298,395 | B1 | 5/2019 | Schiatti et al. |
| 10,438,290 | B1 | 10/2019 | Winklevoss et al. |
| 10,505,726 | B1 | 12/2019 | Andon et al. |
| 10,521,780 | B1 | 12/2019 | Hopkins, III et al. |
| 10,540,654 | B1 | 1/2020 | James et al. |
| 10,721,069 | B2 | 7/2020 | Konda et al. |
| 2002/0143598 | A1 | 10/2002 | Scheer |
| 2005/0177435 | A1 | 8/2005 | Lidow |
| 2009/0204517 | A1 | 8/2009 | Edens et al. |
| 2012/0108446 | A1 | 5/2012 | Wu et al. |
| 2014/0109245 | A1 | 4/2014 | Pestell |
| 2014/0358745 | A1 | 12/2014 | Lunan |
| 2015/0018406 | A1 | 1/2015 | Glimcher et al. |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0278100 | A1 | 9/2017 | Kraemer et al. |
| 2017/0293503 | A1 | 10/2017 | Curtis |
| 2017/0301047 | A1* | 10/2017 | Brown ............... G06Q 20/382 |
| 2017/0316162 | A1 | 11/2017 | Wall Warner et al. |
| 2017/0346639 | A1 | 11/2017 | Muftic |
| 2018/0005186 | A1 | 1/2018 | Hunn |
| 2018/0048461 | A1 | 2/2018 | Jutla et al. |
| 2018/0082043 | A1 | 3/2018 | Witchey et al. |
| 2018/0101701 | A1 | 4/2018 | Barinov et al. |
| 2018/0139043 | A1 | 5/2018 | Jayachandran et al. |
| 2018/0165131 | A1 | 6/2018 | O'Hare et al. |
| 2018/0173378 | A1* | 6/2018 | Tinari ................ G06F 40/166 |
| 2018/0174097 | A1 | 6/2018 | Liu et al. |
| 2018/0189753 | A1 | 7/2018 | Konda et al. |
| 2018/0218176 | A1 | 8/2018 | Voorhees et al. |
| 2018/0218469 | A1 | 8/2018 | Lert, Jr. et al. |
| 2018/0237863 | A1 | 8/2018 | Namsaraev et al. |
| 2018/0331832 | A1* | 11/2018 | Pulsifer ............... H04L 9/0637 |
| 2019/0007381 | A1 | 1/2019 | Isaacson et al. |
| 2019/0012662 | A1* | 1/2019 | Krellenstein ......... G06Q 40/04 |
| 2019/0034923 | A1 | 1/2019 | Greco et al. |
| 2019/0080407 | A1 | 3/2019 | Molinari et al. |
| 2019/0130701 | A1 | 5/2019 | Simons |
| 2019/0164153 | A1 | 5/2019 | Agrawal et al. |
| 2019/0164223 | A1 | 5/2019 | De Jong |
| 2019/0266577 | A1* | 8/2019 | Baldet ................ H04L 67/1042 |
| 2019/0279204 | A1 | 9/2019 | Norton et al. |
| 2019/0299105 | A1 | 10/2019 | Knight et al. |
| 2019/0312869 | A1 | 10/2019 | Han et al. |
| 2019/0319798 | A1* | 10/2019 | Chalkias ............... H04L 9/3247 |
| 2019/0340269 | A1 | 11/2019 | Biernat et al. |
| 2019/0340619 | A1 | 11/2019 | Leong et al. |
| 2019/0385120 | A1 | 12/2019 | Yund et al. |
| 2019/0385156 | A1 | 12/2019 | Liu |
| 2020/0034788 | A1 | 1/2020 | Ynion, Jr. |
| 2020/0034834 | A1 | 1/2020 | Li et al. |
| 2020/0042913 | A1 | 2/2020 | Kumar et al. |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0065380 | A1* | 2/2020 | Kartoun ............... G06F 40/30 |
| 2020/0065761 | A1 | 2/2020 | Tatchell |
| 2020/0082336 | A1 | 3/2020 | Vuppala et al. |
| 2020/0111068 | A1 | 4/2020 | Scarselli |
| 2020/0174990 | A1* | 6/2020 | Pratkanis ............. H04L 9/0637 |
| 2020/0175465 | A1 | 6/2020 | Abuhab |
| 2020/0294128 | A1 | 9/2020 | Cella |
| 2020/0322154 | A1 | 10/2020 | Konda et al. |
| 2020/0327473 | A1 | 10/2020 | Zur et al. |
| 2020/0351093 | A1 | 11/2020 | Madhuram et al. |
| 2020/0351094 | A1 | 11/2020 | Canterbury et al. |
| 2021/0042746 | A1 | 2/2021 | Westland |
| 2021/0150626 | A1 | 5/2021 | Robotham |
| 2021/0157947 | A1 | 5/2021 | Biazetti et al. |
| 2021/0203488 | A1* | 7/2021 | Stahl .................... H04L 9/0637 |
| 2021/0264444 | A1 | 8/2021 | Chen et al. |
| 2021/0326872 | A1 | 10/2021 | Robotham et al. |

FOREIGN PATENT DOCUMENTS

| | | |
|---|---|---|
| WO | WO 2017/187395 | 11/2017 |
| WO | WO 2017/198891 | 11/2017 |
| WO | WO 2018/007828 | 1/2018 |
| WO | WO 2018/028777 | 2/2018 |
| WO | WO 2018/144302 | 8/2018 |
| WO | WO 2018/150275 | 8/2018 |
| WO | WO 2018/163044 | 9/2018 |
| WO | WO 2018/209153 | 11/2018 |
| WO | WO-2020263607 A1 | 12/2020 |

OTHER PUBLICATIONS

Office Action for U.S. Appl. No. 16/283,452, dated Jul. 10, 2019, 31 pages.

Office Action for U.S. Appl. No. 16/283,452, dated Nov. 6, 2019, 34 pages.

International Search Report and Written Opinion for International Application No. PCT/US2019/046532, dated Dec. 2, 2019, 10 pages.

International Search Report and Written Opinion for International Application No. PCT/US2019/046808, dated Dec. 2, 2019, 9 pages.

International Search Report and Written Opinion for International Application No. PCT/US2019/057246, dated Feb. 4, 2020, 8 pages.

International Search Report and Written Opinion for International Application No. PCT/US2019/057262, dated Jan. 24, 2020, 9 pages.

International Search Report and Written Opinion for International Application No. PCT/EP2020/060588, dated Jun. 24, 2020, 13 pages.

International Search Report and Written Opinion for International Application No. PCT/US2020/028128, dated Jun. 25, 2020, 9 pages.

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7...], Retrieved on Aug. 27, 2018, 11 pages.

Ben-Sasson, E. et al., "Scalable, transparent, and post-quantum secure computational integrity," Cryptology ePrint Archive, Report 2018/046 (2018), 83 pages.

International Telecommunication Union, Telecommunication Standardization Sector, Focus Group on Application of Distributed Ledger Technology, DLT-O-067, Output Document, "Updated baseline text: D4.1-DLT regulatory framework," Apr. 2019, 45 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

(56) References Cited

OTHER PUBLICATIONS

Zhang, Y. et al., "Z-Channel: Scalable and efficient scheme in zerocash," 2017, [Online], Retrieved from the Internet: https://eprint.iacr.org/2017/684, pp. 1-39.

Wang, X. et al., "STAMP: Enabling Privacy-Preserving Location Proofs for Mobile Users," IEEE/ACM Transactions on Networking, vol. 24, No. 6, Dec. 2016, pp. 3276-3289.

Kosba, A. et al., "Hawk: The Blockchain Model of Cryptography and Privacy-Preserving Smart Contracts," 2016 IEEE Symposium on Security and Privacy, May 2016, pp. 839-858.

Elmasri, R. et al., "Fundamentals of database systems," Seventh Edition, Pearson, 2016, 1273 pages.

European Commission, "Code of Conduct on Withholding Tax," [Online], Ref. Ares(2017)5654449—Nov. 20, 2017, Retrieved from the Internet: https://ec.europa.eu/taxation_customs/sites/taxation/files/code_of_conduct_on_witholding_tax.pdf, 12 pages.

European Commission, "Non-paper on the withholding tax for discussion at the Expert Group on barriers to free movement of capital," Sep. 28, 2016, https://ec.europa.eu/transparency/regexpert/index.cfm?do=groupDetail.groupDetailDoc&id=28783&no=6 (last accessed Mar. 17, 2021), 6 pages.

European Parliament, Press Release, "Cum-ex tax fraud scandal: MEPs call for inquiry, justice, and stronger tax authorities," [Online], Nov. 29, 2018, Retrieved from the Internet: https://www.europarl.europa.eu/news/en/press-room/20181120IPR19552/cum-ex-tax-fraud-meps-call-for-inquiry-justice-and-stronger-tax-authorities, 4 pages.

European Parliament Resolution of Nov. 29, 2018 on the cum-ex scandal: financial crime and loopholes in the current legal framework (2018/2900(RSP), [Online], Retrieved from the Internet: http://www.europarl.europa.eu/doceo/document/TA-8-2018-0475_EN.html, May 19, 2020, 3 pages.

International Search Report and Written Opinion for International Application No. PCT/EP2020/072325, dated Nov. 6, 2020, 11 pages.

International Search Report and Written Opinion for International Application No. PCT/US2020/061243, dated Feb. 22, 2021, 12 pages.

International Search Report and Written Opinion for International Application No. PCT/US2021/027448, dated Jul. 23, 2021, 11 pages.

ISO 20022, "A single standardisation approach (methodology, process, repository) to be used by all financial standards initiatives," May 2013, [Online], Retrieved from the Internet: https://www.iso20022.org/, 6 pages.

ISO 6166—ISIN—International Securities Identification Number, [Online], Retrieved from the Internet: https://www.isin.net/iso-6166/, Retrieved from the Internet: May 2, 2021, 9 pages.

ISO 6166:2013, "Securities and related financial instruments International securities identification numbering system (ISIN)," Jul. 2013, [Online], Retrieved from the Internet: https://www.iso.org/standard/44811.html, 3 pages.

Kyle, L., "Overview of EY Nightfall," Jun. 13, 2019, [Online], Retrieved from the Internet: https://medium.com/coinmonks/overview-of-ey-nightfall-f9e9ce21cf65, 11 pages.

Lielacher, A., "Ernst & Young Rolls Out 'Nightfall' to enable private transactions on Ethereum," Brave New Coin, Jun. 7, 2019, [Online], Retrieved from the Internet: https://bravenewcoin.com/insights/ernst-and-young-rolls-out-'nightfall-to-enable-private-transactions-on, 6 pages.

OECD (2017), "Commentary on Article 10 Concerning The Taxation on Dividends," In Model Tax Convention on Income and on Capital: Condensed Version 2017, OECD Publishing, Paris, [Online], Retrieved from the Internet: https://read.oecd-ilibrary.org/taxation/model-tax-convention-on-income-and-on-capital-condensed-version-2017_mtc_cond-2017-en, pp. 231-253.

OECD (2020), Centre for Tax Policy and Administration, Glossary of Tax Terms, "Withholding Tax," [Online], Retrieved from the Internet: https://www.oecd.org/ctp/glossaryoftaxterms.htm., 23 pages.

OECD (2020), "TRACE XML Schema: User Guide," OECD, Paris [Online], Retrieved from the Internet: http://www.oecd.org/tax/exchange-of-tax-information/trace-xml-schema-user-guide.htm, 70 pages.

OECD, "Action 13 Country-by-Country Reporting," [Online], Retrieved from the Internet: https://www.oecd.org/tax/beps/beps-actions/action13/, 7 pages.

OECD, Common Reporting Standard (CRS)—Organisation for Economic Co-operation and Development, "What is the CRS?" Jul. 15, 2014, [Online], Retrieved from the Internet: https://www.oecd.org/tax/automatic-exchange/common-reporting-standard/, 3 pages.

OECD, "TRACE Implementation Package," Jan. 23, 2013, [Online], Retrieved from the Internet: https://www.oecd.org/ctp/exchange-of-tax-information/TRACE_Implementation_Package_Website.pdf, 135 pages.

Office Action for U.S. Appl. No. 16/848,506, dated Sep. 13, 2021, 8 pages.

Office Action for U.S. Appl. No. 16/869,944, dated Dec. 3, 2020, 24 pages.

Office Action for U.S. Appl. No. 16/869,944, dated May 21, 2021, 22 pages.

Office Action for U.S. Appl. No. 16/904,296, dated Jun. 10, 2021, 27 pages.

Office Action for U.S. Appl. No. 16/904,296, dated Oct. 21, 2021, 31 pages.

Office Action for U.S. Appl. No. 16/952,949, dated Jun. 15, 2021, 23 pages.

Office Action for U.S. Appl. No. 16/952,949, dated Sep. 30, 2021, 25 pages.

Office Action for U.S. Appl. No. 17/231,467, dated Oct. 1, 2021, 34 pages.

Planta, F., European Securities and Markets Authority (esma), European Parliament—FISC Sub Committee on Fiscal Matters, "Public hearing on Cum/Ex and Cum/Cum scandal," Feb. 22, 2021, ESMA70-155-11890, Retrieved from the Internet: https://www.esma.europa.eu/sites/default/files/library/esma70-155-11890_statement_cumex_cumcum_scandal_-_fabrizio_planta.pdf, 3 pages.

Shahid, A. et al., "Blockchain-based agri-food supply chain: A complete solution," IEEE Access, IEEE, vol. 8, Apr. 2020, pp. 69230-69243.

Westerkamp, M. et al., "Blockchain-based supply chain traceability: Token recipes model manufacturing processes," 2018 IEEE Confs on Internet of Things, Green Computing and Communications, Cyber, Physical and Social Computing, Smart Data, Blockchain, Computer and Information Technology, Congress on Cybermatics, IEEE, Jul. 2018, pp. 1595-1602.

\* cited by examiner

METHODS AND SYSTEMS FOR ENHANCING NETWORK PRIVACY OF MULTIPLE PARTY DOCUMENTS ON DISTRIBUTED LEDGER-BASED NETWORKS

CROSS-REFERENCE TO RELATED PATENT APPLICATION

This application claims priority to and the benefit of U.S. Provisional Application No. 62/834,254, filed Apr. 15, 2019, entitled "Methods and Systems for Enhancing Network Privacy of Multiple Party Documents on Distributed Ledger-Based Networks," which is incorporated herein by reference in its entirety.

FIELD OF THE DISCLOSURE

The instant disclosure illustrates how the privacy and security of activities occurring on distributed ledger-based networks (DLNs) can be enhanced with the use of zero-knowledge proofs (ZKPs) that can be used to verify the validity of at least some aspects of the activities without private information related to the activities necessarily being revealed publicly. Methods and systems that are directed at providing enhanced security and privacy to multiple party communications occurring on ZKP-enabled DLNs are presented herein.

BACKGROUND

Distributed ledger-based networks (DLNs) dispense with the need for a central authority to manage the operations of the networks due to their transparency and consensus-based verification mechanisms for validating actions occurring on the DLNs, which allow participants of the networks to trust the accuracy of the validations without the central authority. The transparency and consensus-based verification mechanisms, however, compromise the privacy of the actions and the involved parties, as relevant information has to be shared with at least a substantial portion of the participants of the DLNs for the actions to be validated.

SUMMARY

In some embodiments, methods and systems are directed at providing enhanced security and privacy to transactions occurring on ZKP-enabled distributed ledger-based networks (DLNs) among multiple parties. For example, the transactions may include multi-party documents or instruments that are configured for consideration and approval by multiple participants of the DLNs. In such embodiments, the methods include generating, via a processor and for use on a DLN, a commitment to facilitate an approval, by a party of a plurality of parties, of a document to be approval by the plurality of parties on a distributed ledger-based network (DLN), the commitment generated by hashing a public identifier on the DLN of the party and/or a random nonce. Further, the methods include generating, via the processor, a hierarchical tree structure that includes the commitment as a leaf node of the hierarchical tree structure; and providing, via the processor and to a self-executing code segment on the DLN, the commitment, a hash of an expression of the agreement and/or a root of the hierarchical tree structure. In addition, the methods include providing, via the processor, a duplicate of the expression of the agreement to the party.

In some embodiments, the hashing the public identifier and/or the random nonce includes hashing a result of an application of a combining operator on the public identifier and the random nonce. For example, the combining operator can be a concatenation operator. Further, the public identifier can be a public key of the party on the DLN. In some embodiments, the hierarchical tree structure is a Merkle tree. In some embodiments, providing the commitment, the hash of the content of the multi-party document and/or the root of the hierarchical tree structure occurs without an identity of the party and/or the content of the multi-party document being revealed on the DLN. Further, providing the duplicate of the content of the multi-party document may occur without an identity of the party and/or the content of the multi-party document being revealed on the DLN.

Some embodiments of the current disclosure disclose a method that comprises receiving, at a computing node of a DLN, a hierarchical tree structure that includes a commitment as a leaf node of the hierarchical tree structure. The commitment can be generated to facilitate an approval, by a party of a plurality of parties, of a document to be approved by the plurality of parties on the DLN. Further, the commitment can be generated via a first application of a first hashing function on a public identifier on the DLN of the party and/or a random nonce. In some embodiments, the method also comprises receiving, at the computing node, (1) a nullifier obtained via a second application of a second hashing function on the random nonce and/or a secret identifier of the party, and (2) a zero-knowledge proof (ZKP). In some implementations, receiving the hierarchical tree structure and/or receiving the nullifier can occur without an identity of the party and/or the content of the multi-party document being revealed on the DLN. Further, the method comprises adding the nullifier into a nullifier data structure on the DLN after verification of: (i) an absence of the nullifier from the nullifier data structure, and/or (ii) the ZKP by a self-executing code segment on the DLN.

The ZKP can include a proof of one or more of (a) the hierarchical tree structure includes the commitment as the leaf node; (b) the second application of the second hashing function includes the second application of the second hashing function on the random nonce; and (c) the secret identifier and the public identifier are corresponding identifiers of an identifier pair that includes the secret identifier and the public identifier on the DLN of the party. In some implementations, the ZKP that the hierarchical tree structure includes the commitment as the leaf node includes the ZKP that the commitment is obtained via the first application of the hashing function on the public identifier and/or the random nonce.

In some embodiments, the method further comprises receiving, at the computing node, a first hash of a first content of the multi-party document. In such cases, the receiving the nullifier occurs after a comparison of the first hash of the first content of the multi-party document to a second hash of a second content of the multi-party document received by the party indicates that the first content and the second content are true duplicates of each other. In some embodiments, the method also comprises increasing a count of parties that approved the multi-party document by one after adding the nullifier into the nullifier data structure.

In some embodiments, the second application of the second hashing function on the random nonce and/or the secret identifier includes the second application of the second hashing function on a result of an application of a combining operator on the random nonce and the secret identifier. In some implementations, the combining operator can be a concatenation operator. In some embodiments, the hierarchical tree structure is a Merkle tree. Further, the public identifier is a public key of the party on the DLN. In addition, the private identifier can be a private key of the party on the DLN.

Some embodiments of the current disclosure disclose a method that comprises receiving, at a computing node of a DLN, a hierarchical tree structure that includes a plurality of commitments as leaf nodes of the hierarchical tree structure. Each commitment of the plurality of commitments can be generated via a first application of a first hashing function on a random nonce and/or a public identifier of a party that is from a plurality of parties and that is uniquely associated with that commitment. In such embodiments, the hierarchical tree structure can be generated to facilitate an approval of a multi-party document by the plurality of parties.

The method may include receiving, at the computing node and from that party of the plurality of parties, (i) a nullifier obtained via a second application of a second hashing function on the random nonce and/or a secret identifier of that party, and (ii) a zero-knowledge proof (ZKP) that (a) the hierarchical tree structure includes the commitment for that party as one leaf node of the leaf nodes of the hierarchical tree structure; (b) the second application of the second hashing function includes the second application of the second hashing function on the random nonce; and/or (c) the secret identifier and the public identifier of that party are corresponding identifiers of an identifier pair that includes the secret identifier of that party and the public identifier on the DLN of that party.

In some embodiments, the method comprises adding the nullifier onto a nullifier data structure after verification of: (1) an absence of the nullifier from the nullifier data structure, and/or (2) the ZKP by a self-executing code segment on the DLN. Further, the method comprises generating a confirmation confirming approval of the multi-party document by each party of the plurality of parties after verifying that a total count of received nullifiers added onto the nullifier data structure equals a number of commitments in the plurality of commitments in the hierarchical tree structure. In some implementations, generating the confirmation occurs without an identity of each party from the plurality of parties and/or a content of the multi-party document being revealed on the DLN.

In some embodiments, the method further comprises receiving, at the computing node, a first hash of a first content of the multi-party document. In such cases, the receiving the nullifier occurs after a comparison of the first hash of the first content of the multi-party document to a second hash of a second content of the multi-party document received by each party of the plurality of parties indicates that the first content and the second content are true duplicates of each other. In some embodiments, the multi-party document can be a legal contract.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer). In some embodiments, the transactions may include multi-party documents or instruments that prompt review or consideration and approval from multiple participants of the transactions, and the DLN may also be used to facilitate these transactions without a central authority. For example, the transactions can be or include the execution of an agreement or a legal contract between two or more participants of the DLN, and the DLN can be used to facilitate the contracting process without a middle person (e.g., central authority) controlling the process.

Throughout the instant disclosure, in some embodiments, the terms "multi-party document" and "instrument" may be used interchangeably to refer to electronic expressions of materials that may be presented to multiple participants of a transaction on a DLN to consider or review and grant approval. For example, a multi-party document or an instrument can be a legal contract that is part of a transaction and includes an agreement for consideration or review by the participants of the transaction for their signatures. As another example, a multi-party document or an instrument can be a report (e.g., a disclosure report to be submitted to a government agency) that may have to be reviewed by multiple parties and signed onto. Accordingly, the terms "multi-party document" and "instrument" are to be understood broadly to include any expression that is configured for consideration or review, and subsequent approval, by multiple parties that are involved in a transaction that includes the multi-party document or instrument. That is, the methods and system disclosed herein are agnostic as to the expression that is presented via the multi-party documents/instruments.

In some embodiments, a DLN can be and/or support a blockchain. In some embodiments, the terms "distributed ledger-based network" and "blockchain network" herein may be used interchangeably. Similarly, in some embodiments, the terms "self-executing code" or "self-executing code segment" and "smart contract" may be used interchangeably. Further, in some embodiments, the term "transaction" may be used to refer, without limitations, to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. In some embodiments, the term "transaction" may also be used to refer to transactions that occur on the DLN (e.g., transfer of tokens such as but not limited to cryptocurrency between accounts on the DLN). In some embodiments, the terms "off-chain" or "off-the DLN" are to be understood to refer to states or actions that are not occurring "on the blockchain network" or "on the DLN." For example, a statement such as "the data is stored off-the DLN" is to be understood to refer to the state of the data not being stored on the storage systems of, or not being controlled by, the DLN (and is instead stored at or controlled by systems elsewhere, i.e., on storage systems that are not part of the DLN)."

As noted above, in some embodiments, the trust the distributed ledger-based networks provide with no need for a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some instances and/or for some parties, the lack of privacy or confidentiality can render the use of a public ledger-based network untenable. For instance, a transaction may include the formation of a legal contract or agreement between a health care provider and a patient, and the use of a public blockchain network to effect the formation of the contract without a mechanism to conceal at least some aspects of the transaction may publicly expose personal and health-related information of the patient (thereby violating the patient's privacy and possibly health privacy laws).

In some cases, private DLNs can be used to provide participants of the DLNs a measure of privacy that may not be available on public networks. The privacy afforded by private (non-ZKP-enabled) DLNs, however, is far from adequate for most purposes (how ZKPs can be used to provide privacy to private and/or public blockchain networks will be discussed in details below). For example, with reference to the above example, the personal and health-related data of customers would still be available for inspection by other members of a private non-ZKP-enabled DLN (even if the data is hidden from the public). Further, private non-ZKP-enabled DLNs would be burdensome to maintain as, amongst other reasons, applications developed for public blockchain networks may not seamlessly interoperate on private non-ZKP-enabled blockchain networks.

The inefficiency and cost associated with private non-ZKP-enabled DLNs may be illustrated with reference to the internet, which suffers from several privacy and security-related ills due to the openness of the network to anyone capable of accessing the network. Setting up a "private" intranet network can be one way to combat the noted privacy and security-related ills. Such private networks, however, are likely to severely lag in their developments, and even then to be costly to maintain, compared to the open internet, as the closed nature of the private networks would limit interoperability of applications developed for the open or public internet. Analogously, a private DLN would likely lag in its development compared to a public DLN and still be costly to maintain. One or more embodiments described herein disclose methods and systems that are directed at providing enhanced privacy and security to DLNs via the implementation of ZKPs in the DLNs. It is to be noted that, although descriptions of these embodiments refer to public DLNs, the methods and systems equally apply to private DLNs.

In some embodiments, as noted above, methods and systems provide privacy to participants of a transaction on a ZKP-enabled DLN while retaining the level of trust afforded by decentralized networks (i.e., with no central authority) such as DLNs, the transaction including a multi-party document or an instrument that prompts review/consideration and approval from multiple participants of the transaction. For example, a multi-party document that prompts consideration and approval from multiple participants of a transaction may be a legal contract or agreement that is meant to be considered by the participants of the transaction and signed on as indication of approval or agreement. As another example, the multi-party document may be a joint statement or report that requires the consideration and approval or signatures of multiple parties (e.g., regulatory filings that are reviewed and signed by multiple executives of a company prior to filing with a governmental body).

In some embodiments, one or more of the methods and systems disclosed herein allow for the identities of participants of a transaction that includes such a multi-party document as well as the details of the multi-party document (e.g., contents of the multi-party document such as contract terms, etc.) to remain secret when a public blockchain network is used to manage the transaction. Examples of parties to a transaction that includes such a multi-party document include a party (or parties) that prepare and deploy the multi-party document, a party (or parties) that review and approve the multi-party document, etc. In some implementations, the identities of the parties to the transaction as well as the details of the multi-party document may be kept secret from the public at large and/or from other participants of the ZKP-enabled DLN that are not party to the transaction. In some implementations, the identities of the transaction participants may also be kept confidential from each other (except, in some cases, from the party that prepares and deploys the multi-party document or agreement). For example, the parties to a transaction that includes a legal contract or agreement may wish to engage in the agreement anonymously and may demand to have their identity kept confidential from all, including the other participants of the transaction, as a condition for signing the contract. In such embodiments, the methods and systems disclosed herein allow for the identities of the signatories to a statement or legal contract, and/or contents thereof, to be kept confidential while using the ZKP-enabled DLN to execute the transaction that includes the statement or legal contract. That is, the identities of the signatories and/or the contents of the statement or contract may not be revealed due to the use of the ZKP-enabled DLN to execute the transaction. In such examples, the parties may be represented on the blockchain network by their respective public keys. Further, the methods and systems disclosed herein for facilitating the consideration and approval of a multi-party document without revealing the identities of the signatories and/or the contents of the multi-party document may be agnostic to the format of the multi-party document.

Figure 1:
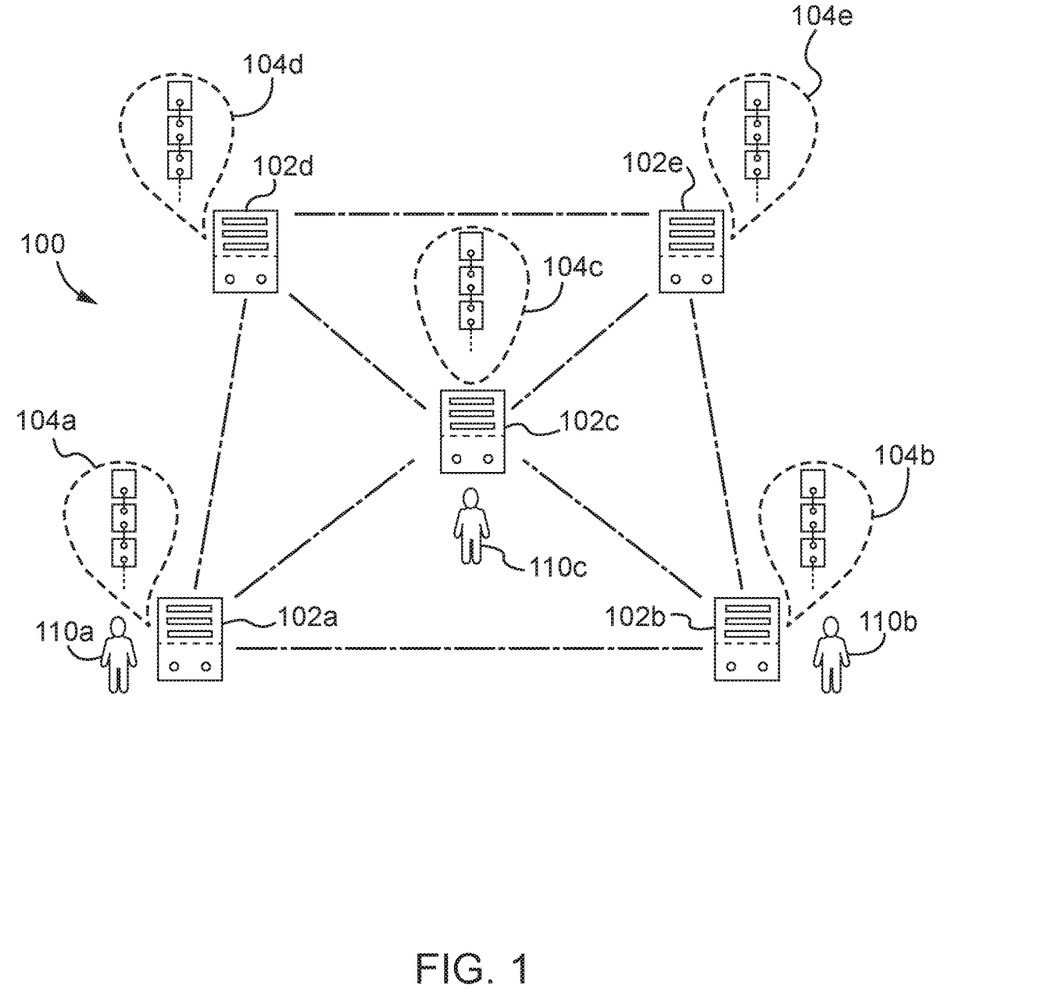
FIG. 1 shows a distributed ledger-based network configured for use in conducting a private interaction between multiple parties that are participants of the network, according to an embodiment.

FIG. 1 shows a ZKP-enabled DLN configured for use in managing and representing a private transaction between two parties that are participants of the network, in particular a public network, according to an embodiment. As shown in FIG. 1, the ZKP-enabled DLN or blockchain network 100 includes multiple computing nodes 102a-102e configured to communicate amongst each other via a peer-to-peer (P2P) connection. In some implementations, the computing nodes 102a-102e can each be computing devices including but not limited to a computer, server, processor, data/information processing machine or system, and/or the like, and include a data storage system such as a database, memory (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., using wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results for which can be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more compute device(s) such as oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may gather information related to the smart contract and/or the ZKP-enabled DLN 100 (e.g., for use by external systems). For example, the oracle may query the state of the smart contract periodically and register any changes (which may be accessed later by the external systems). As another example, an execution of the smart contract may cause changes to the ZKP-enabled DLN 100 or parts thereof (e.g., to a storage system of the ZKP-enabled DLN 100) and the oracle may query for and register these changes, again for later access by the external systems.

In some embodiments, at least a substantial number of the computing nodes 102a-102e (e.g., at least greater than 50%, 60%, 75%, 90%, including values and subranges therebetween, of the total number of computing nodes 102a-102e that make up the ZKP-enabled DLN 100) include copies of a distributed ledger 104a-104e onto which transactions that occur on the network are recorded. The recording of the transactions on the distributed ledger 104a-104e may occur when some substantial number of the computing nodes 102a-102e, or a subset thereof, agree on the validity of the transactions. The distributed ledger 104a-104e can be immutable or nearly immutable in the sense that to alter the distributed ledger 104a-104e, at least this substantial number of the computing nodes 102a-102e would have to agree, which can be increasingly difficult when the number of computing nodes 102a-102e is large (and the distributed ledger 104a-104e gets longer).

As noted above, in some embodiments, the ZKP-enabled DLN 100 can be used to facilitate the consideration and approval of a multi-party document (e.g., legal contract/agreement, report, statement, etc.) that is part of a transaction by multiple participants of the transaction without revealing the contents of the multi-party document and/or the identities of the participants to each other (e.g., except, in some cases, to the participant that prepared and deployed the multi-party document), to other participants of the ZKP-enabled DLN 100 that are not party to the transaction, to the public at large, and/or etc. In some embodiments, a first participant 110a of a transaction may prepare a multi-party document (e.g., legal contract, report, statement, etc.) configured for consideration and approval by the participants of the transaction and provide the multi-party document to the smart contract of the ZKP-enabled DLN 100. In some implementations, the participants of the transaction may include two or more of the participants of the ZKP-enabled DLN 100 including the first participant 110a and the transaction participants 110b, 110c. In some implementations, the first transaction participant 110a may prepare and deploy the multi-party document as discussed in detail below with reference to FIG. 2. The first transaction participant 110a may also distribute to the one or more transaction participants 110b, 110c copies of the multi-party document secretly, i.e., without revealing the contents of the multi-party document to the public at large or the participants of the ZKP-enabled DLN 100 that are not party to the transaction or other participants of the transaction. Further, the first transaction participant 110a may provide a copy of the multi-party document to a transaction participant (e.g., 110b) without revealing to the public at large, the participants of the ZKP-enabled DLN 100 that are not party to the transaction or the other transaction participant 110c the identity of the transaction participant 110b and/or the fact that transaction participant 110c has received the multi-party document or is a part of the transaction.

In some implementations, the secret distribution of copies of the multi-party document may occur via a communications channel that is separate from the ZKP-enabled DLN 100. In some implementations, copies of the multi-party documents may be encrypted and distributed via the ZKP-enabled DLN 100. For example, an encrypted copy of the multi-party document may be stored on the ZKP-enabled DLN 100 (e.g., at a distributed database stored in the storage systems of the computing nodes 102a-102e of the ZKP-enabled DLN 100) and the keys to decrypt the encrypted multi-party document may be provided to each of the transaction participants 110b, 110c via a separate communications channel or a communications channel that is linked or coupled to the ZKP-enabled DLN 100. For instance, if the ZKP-enabled DLN 100 is an Ethereum blockchain network, encrypted copies of the multi-party document(s) may be stored on an Ethereum Swarm database and the decryption keys may be provided to each of the transaction participants 110b, 110c via an Ethereum Whisper communications channel coupled to the Ethereum blockchain network. As another example, the encrypted multi-party document, along with the decryption keys, may be provided to each of the transaction participants 110b, 110c via the communications channel that is linked or coupled to the ZKP-enabled DLN 100 (e.g., via Ethereum Whisper).

In some embodiments, if one or more of the transaction participants 110b, 110c wish to approve the multi-party document (e.g., sign the legal contract, indicate receipt and/or approval of the statement or report, etc.), then the transaction participants 110b, 110c may generate an indication of the approval and a proof that the transaction participants 110b, 110c are entitled to approve the multi-party document for submission to the smart contract of the ZKP-enabled DLN 100. For example, the multi-party document may be a legal contract to be reviewed and approved by the transaction participants 110b, 110c. In such implementations, if any of the transaction participants 110b, 110c wishes to approve the legal contract, the approving transaction participant may first generate and send to the smart contract an indication of approval that serves as a contract signature. Further, the approving transaction participant may generate a proof (e.g., a zero-knowledge proof (ZKP)) that proves that he or she is in fact one of the transaction participants 110b, 110c that the first transaction participant 110a (e.g., the preparer and deployer of the multi-party document) intended to approve the multi-party document (e.g., legal contract). The approving transaction participant may then provide the indication of approval as well as the proof to the smart contract so that the smart contract may verify the proof and recognize or confirm the approval of the multi-party document. The generation of the indication of approval and the generation of the ZKP are discussed in detail below with reference to FIG. 3.

In some embodiments, ZKPs can be used by a first entity, the "prover" or "provider" of the proofs, to convince a second entity, the "verifier" of the proofs, that a statement about some secret information is truthful without having to reveal the secret information to the prover. For example, a signatory of a multi-party document may generate and provide a ZKP to the smart contract of the ZKP-enabled DLN 100 to prove to the smart contract (and by extension, to other participants of the transaction or the ZKP-enabled DLN 100), without revealing the identity of the signatory publicly or on the ZKP-enabled DLN 100, that the signatory is one of the transaction participants 110b, 110c that is entitled or authorized to sign the multi-party document. In some embodiments, ZKPs can be interactive, i.e., require interaction from the prover for the verifier to verify the truthfulness of the statement that the prover is making. In some embodiments, ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of ZKPs can be found in U.S. patent application Ser. No. 16/283,452, filed Feb. 2, 2019, entitled "Methods and Systems for enhancing Privacy and Efficiency on Distributed Ledger-Based Networks,", which is incorporated by reference herein in its entirety.

Figure 2:
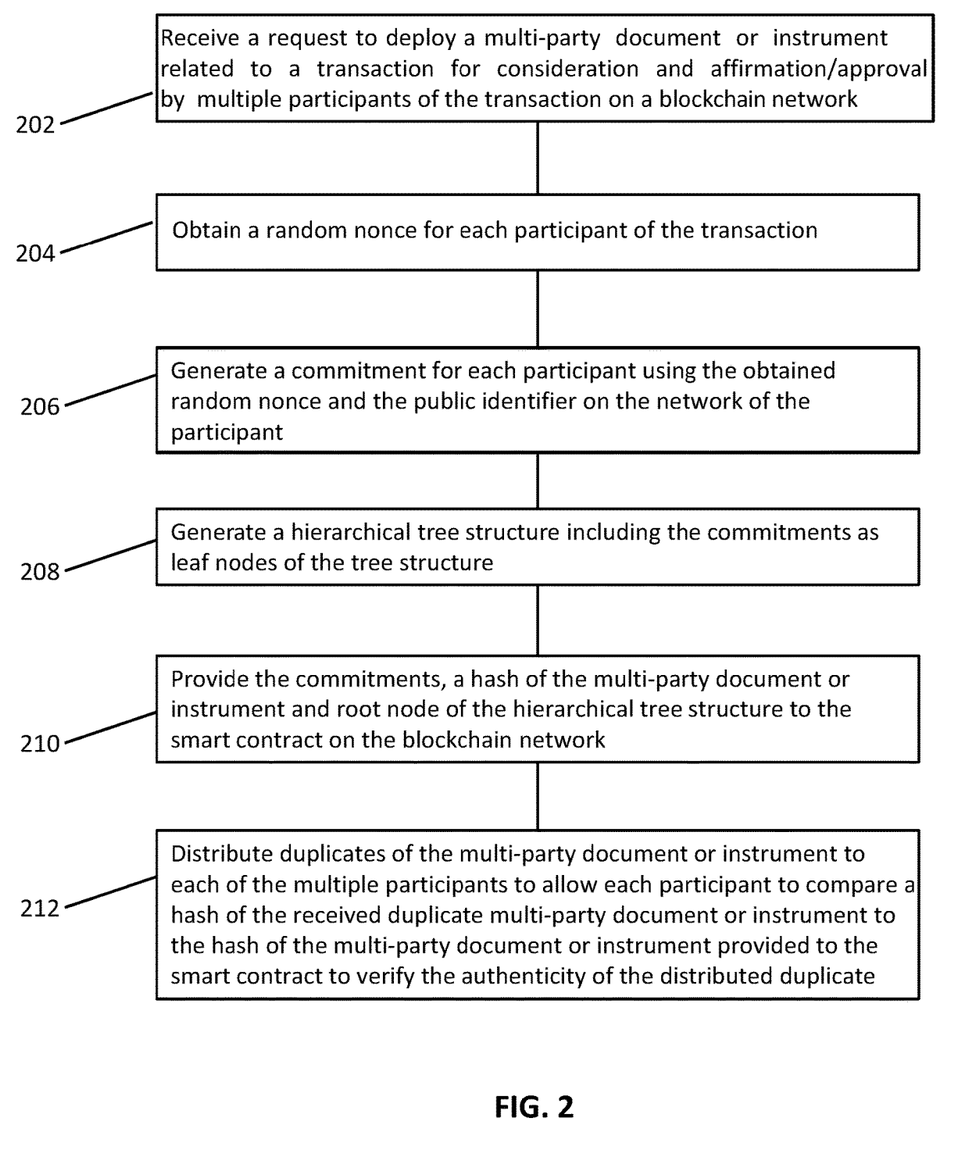
FIG. 2 shows a flow chart illustrating the deployment of a multi-party document or instrument for consideration and approval by participants of a distributed ledger-based network, according to an embodiment.

FIG. 2 shows a flow chart illustrating the deployment of a multi-party document or instrument for consideration and approval by participants of a distributed ledger-based network, according to an embodiment. As shown in FIG. 2, at 202, a first participant 110a of a transaction on a ZKP-enabled DLN 100 (referred hereinafter as the multi-party document deployer 110a) may receive a request to prepare and deploy a multi-party document for consideration and approval by multiple participants 110b, 110c of the transaction. In some embodiments, the multi-party document may be a legal contract that is part of a transaction. For example, multiple participants of a DLN may be engaged in a transaction and may wish to execute a legal contract as part of the transaction in a discreet manner (e.g., without necessarily revealing the identities of the participants to each other or other participants of the ZKP-enabled DLN 100 and/or without necessarily revealing the contents of the contract publicly). In such implementations, the multi-party document deployer 110a may, at the computing node 102a, receive a request and be tasked with preparing a legal contract for consideration and approval (e.g., signature) by the other participants 110b, 110c of the transaction. As another example, the multi-party document may be a statement or report (e.g., a disclosure such as one to a regulatory agency that is reviewed and approved by transaction participants 110b, 110c), and the multi-party document deployer 110a may be tasked to prepare and deploy the statement or report. In some instances, the multi-party document deployer 110a may also be part of the transaction, i.e., the multi-party document deployer 110a is to approve the multi-party document along with the other transaction participants 110b, 110c as part of the transaction.

At 204, in some embodiments, after receiving the request, the multi-party document deployer 110a may proceed with obtaining nonces (e.g., randomly selected cryptographic nonces) $S_i$ for each participant of the transaction (i denotes the transaction participants that are entitled or authorized to consider and approve the multi-party document). In some implementations, a nonce $S_i$ can be a randomly chosen number of sufficient length such that the probability of generating the same number again in a subsequent transaction is at most infinitesimal (and as such, may be neglected). For instance, the nonce $S_i$ may be a randomly selected 256-bit number. In some implementations, a random nonce may comprise numerical digits and/or letters. That is, the random nonces can be, for example, random serial numbers or alpha-numerics that are securely generated and used, at least in almost all cases, only once. In some embodiments, the random nonces may be obtained from a source that is mutually accepted or acknowledged by the multi-party document deployer 110a and the other participants of the transaction 110b, 110c as an acceptable source of random nonces. In some implementations, references to random nonces can include pseudo-random nonces; in other words, it is not necessary for nonces to be generated in a purely random way but pseudo random may be sufficient.

At 206, the multi-party document deployer 110a may generate, using the computing node 102a, a commitment to represent on the ZKP-enabled DLN 100 the participants of the transaction, such as but not limited to the participants 110b, 110c, the multi-party document deployer 110a, etc., that are entitled or authorized to consider or review and approve the multi-party document prepared by the multi-party document deployer 110a. For example, the commitments may be generated based on identifiers of the transaction participants 110a-110c. For example, for each transaction participant (e.g., 110b or 110c), a commitment may be generated by the application of a cryptographic hashing function on a public identifier of the participant such as, but not limited to, the public key of the participant on the ZKP-enabled DLN 100. Further, in some implementations, the multi-party document deployer 110a may wish to also use a secret element in generating the commitment so as to prevent others from generating the same commitment using publicly available data, i.e., the public identifier. For example, for each transaction participant, the commitment may be generated by the application of a cryptographic hashing function on the nonces $S_i$, combined with the above-noted public identifier, obtained for that participant of the transaction. In such a manner, for each transaction participant that is tasked with considering and approving the multi-party document, the multi-party document deployer 110a generates, using the computing node 102a, a commitment that is unique (e.g., due to the use of the secret element (e.g., random nonce $S_i$)) and encodes some information associated with the transaction participant (e.g., due to the use of the public identifier of the participant).

In some embodiments, the generation of the commitment for each transaction participant may be performed as follows: $Z_i=H(Pk_i \circledast S_i)$, where $Pk_i$ is the public key on the blockchain 100 that is associated with that transaction participant denoted i, $S_i$ is the random cryptographic nonce obtained for that transaction participant, H is a cryptographic hashing function or algorithm (e.g., SHA-256), and $\circledast$ represents a combining operator (e.g., the concatenation operator |, etc.). In some embodiments, the computation of the token commitment $Z_i$ may include application of the hashing function on additional elements besides or instead of the random cryptographic nonce $S_i$ and the public identifier or key $Pk_i$. In some embodiments, the token commitment for a transaction participant consists of only a random cryptographic nonce (e.g., a securely and randomly generated serial number) and the public identifier on the ZKP-enabled DLN 100 of that transaction participant. In some embodiments, the generation or computation of the commitment can be performed without revealing or exposing the identities of the random cryptographic nonces $S_i$ (e.g., to the transaction participants or publicly).

After the generation of commitments for each participant of the transaction that is tasked with reviewing or considering a multi-party document and approving it, at 208, the multi-party document deployer 110a may proceed with generating a hierarchical tree structure that includes the commitments therein. For example, the hierarchical tree structure may be a Merkle tree and the commitments may be included in the Merkle tree as leaf nodes. In some embodiments, multiple hierarchical tree structures may be generated, each tree structure including one or more commitments as leaf node. In some embodiments, a single tree structure may be generated, with the single tree structure including all the commitments as leaf nodes. For example, each commitment of the multiple commitments generated for the participants of a transaction as discussed above may be included in a single Merkle tree as leaf nodes of the tree.

After the hierarchical tree structure(s) are generated, at 210, the multi-party document deployer 110a may provide or publish, using the computing node 102a, the commitments, the root node of the hierarchical tree structure(s) (e.g., the Merkle root) and/or a hash of the multi-party document (e.g., legal contract), to a self-executing code or smart contract on the ZKP-enabled DLN 100. As such, the smart contract on the ZKP-enabled DLN 100 may have access to the multi-party document that is to be considered and approved by the participants of the transaction that includes the multi-party document. Further, the smart contract may also have access to the commitments that encode at least some information about the participants (e.g., due to the use of the public keys on the ZKP-enabled DLN 100 of the participants in generating the commitments). In some implementations, the multi-party document deployer 110a may provide or publish to the smart contract on the ZKP-enabled DLN 100, using the computing node 102a, the hash of the root node of the hierarchical tree structure(s) (e.g., the hash of the Merkle root). In some implementations, the hash of the multi-party document and/or the root node or the hash of the root node of the Merkle tree may be provided or published to the smart contract anonymously.

At 212, the multi-party document deployer 110a may then distribute, using the computing node 102a, copies of the multi-party document to each participant of the transaction that is tasked with considering and approving the multi-party document. In some implementations, each participant 110b, 110c, using the computing nodes 102b, 102c, respectively, can then verify that the copy of the multi-party document distributed to that participant 110b, 110c contains the same content as the multi-party document originally prepared by, and deployed to the smart contract, by the multi-party document deployer 110a. For example, each participant 110b, 110c may hash, using the computing nodes 102b, 102c, the copy of the multi-party document distributed to that participant 110b, 110c, and compare the hashed copy to the hash of the multi-party document provided to the smart contract to determine if the distributed multi-party document is a true duplicate of the multi-party document provided to the smart contract.

After confirming that the distributed multi-party document is a true duplicate of the multi-party document provided to the smart contract, each participant 110b, 110c may review the distributed multi-party document and decide to provide approval of the multi-party document. In some instances, the multi-party document deployer 110a may also be part of the transaction that includes the multi-party document, and the multi-party document deployer 110a may also decide to approve the multi-party document. For example, the transaction may include a legal contract (i.e., multi-party document) to be reviewed and agreed upon by the transaction participants 110b, 110c (and optionally, the legal contract or multi-party document deployer 110a). In such examples, the transaction participants 110b, 110c (and optionally, the contract or multi-party document deployer 110a) may wish to indicate their approval of the contract to the smart contract of the ZKP-enabled DLN 100. The generation of the indications of approval by the transaction participants 110b, 110c (and optionally, the contract or multi-party document deployer 110a) and the confirmation, by the smart contract, of the indications of approval are discussed in detail below with reference to FIG. 3.

Figure 3:
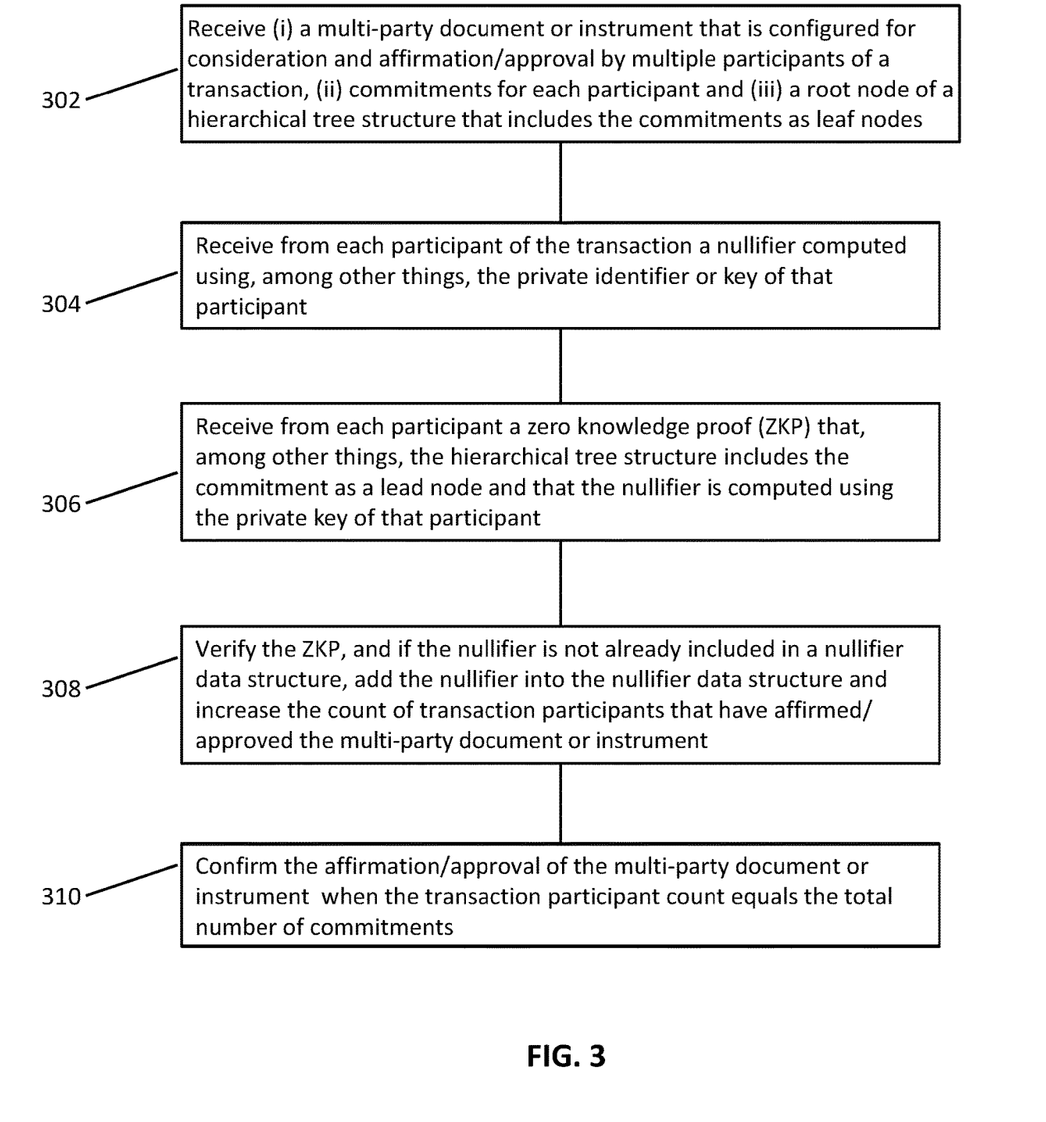
FIG. 3 shows a flow chart illustrating the confirmation of the approval of a deployed multi-party document or instrument after receipt of indications of approval from participants of the distributed ledger-based network, according to an embodiment.

FIG. 3 shows a flow chart illustrating the confirmation of the approval of a deployed multi-party document or instrument after receipt of indications of approval from participants of the distributed ledger-based network, according to some embodiment. In some embodiments, at 302, as discussed above, the smart contract may receive from the multi-party document deployer 110a a multi-party document that is configured for consideration and approval by the participants 110b, 110c of a transaction that includes the multi-party document, a commitment for each participant that is generated via the application of a cryptographic hashing function on the public identifier, on the ZKP-enabled DLN 100, of that participant and/or a random nonce (e.g., cryptographically random nonce), and the root node of the hierarchical tree structure(s) (e.g., the Merkle root) that include the commitments as leaf node of the structure. Further, as also noted above, the participants 110*b*, 110*c* may receive from the deployer 110*a* copies of the multi-party document, which the participants then can hash and compare with the hash of the multi-party document provided to the smart contract on the ZKP-enabled DLN 100 to verify that the copies they received are accurate duplicates.

At 304, a transaction participant 110*b*, 110*c* may wish to approve the multi-party document to the smart contract on the ZKP-enabled DLN 100, and as an indication of the approval may generate and provide to the smart contract a nullifier. In some implementations, the nullifier may be a number or an alpha-numeric. As the nullifier serves as an indication of approval of the multi-party document from the transaction participant 110*b*, 110*c*, in some implementations, the nullifier can be constructed or generated out of the random nonce $S_i$ that was used to generate the commitment $Z_i$ for that transaction participant 110*b*, 110*c*. The use of the random nonce $S_i$ (that was used to generate the commitment $Z_i$) to generate the nullifier can serve as an indication to the smart contract that the nullifier may be viewed as an indication of approval for the multi-party document that is related to the commitment $Z_i$. The random nonce $S_i$, however, may be known to other participants of the ZKP-enabled DLN 100, such as the multi-party document deployer 110*a*. To demonstrate to the smart contract that the nullifier is in fact constructed or generated by the transaction participant 110*b*, 110*c* (and not by the multi-party document deployer 110*a* or anyone else that has access to the random nonce $S_i$, for example), in some embodiments, the transaction participant 110*b*, 110*c* may include in the nullifier a secret element or identifier that is known only to the transaction participant 110*b*, 110*c*. For example, in some embodiments, the nullifier can be computed via an application of a hashing function H on the nonce $S_i$ and the private identifier (e.g., private key) on the ZKP-enabled DLN 100 of the transaction participant 110*b*, 110*c*, $Sk_i$, as follows: $N_i = H(S_i \circledast Sk_i)$, where the combining operator $\circledast$ may include the concatenation operator |, and/or the like.

At 306, the transaction participant 110*b*, 110*c* may provide the nullifier $N_i$ to the smart contract, via the computing node 102*b*, 102*c*, along with a ZKP that the $N_i$ is generated via an application of the hashing function H on the random nonce $S_i$ and the private identifier (e.g., private key) $Sk_i$ of the transaction participant 110*b*, 110*c* on the ZKP-enabled DLN 100. In some implementations, the hashing allows the transaction participant 110*b*, 110*c* to hide the identity of the random nonce $S_i$ and/or the private identifier (e.g., private key) $Sk_i$, and the ZKP allows the transaction participant 110*b*, 110*c* to convince the smart contract, if the proof is verified, that $N_i$ includes $S_i$ and $Sk_i$, without necessarily having to reveal $S_i$ and $Sk_i$ themselves to the smart contract or other participants of the ZKP-enabled DLN 100. Further, the ZKP may include the proof that the hierarchical tree structure, the root node of which was provided to the smart contract by the multi-party document deployer 102*a*, includes the transaction participant's commitment $Z_i$, computed by hashing the public key $Pk_i$ of the participant and $S_i$ as follows: $Z_i = H(Pk_i \circledast S_i)$. In some implementations, the ZKP may also include the proof that $Sk_i$ is the private identifier (e.g., private key) of the transaction participant 110*b*, 110*c* on the ZKP-enabled DLN 100 that corresponds to the public key $Pk_i$.

Upon receiving the above-identified ZKPs, at 308, the smart contract may verify the ZKPs and/or check that the nullifier $N_i$ is not already included in a nullifier data structure (not shown) of the ZKP-enabled DLN 100. In some implementations, the nullifier data structure may include all the nullifiers that have been provided to the smart contract as indications of multi-party document approval by transaction participants. For example, the nullifier data structure may be stored on the ZKP-enabled DLN 100 (i.e., the data structure may be stored on storage systems that are linked to or part of the computing nodes 102*a*-102*e* that make up the ZKP-enabled DLN 100) and may contain nullifiers submitted to the smart contract by transaction participants to indicate their willingness to sign (i.e., approve) a legal contract. In some implementations, the nullifier data structure may be in the form of an array through which the smart contract can iterate to compare the nullifier $N_i$ (i.e., the nullifier provided to the smart contract by the transaction participant 110*b*, 110*c*) to the nullifiers that are stored in the nullifier data structure. In some embodiments, the nullifier data structure may be in the form of a hash table that the smart contract can directly look up to determine the presence of the nullifier $N_i$ in the nullifier data structure.

As $N_i$'s presence in the nullifier data structure is indicative of the approval of the multi-party document by the transaction participant that provided $N_i$ to the smart contract, in some implementations, its prior presence on the nullifier data structure would indicate that the transaction participant has already provided the approval (e.g., signed the legal contract), which would cause the smart contract to disregard the submission of the new $N_i$. In some embodiments, the smart contract may verify that the nullifier N is not included in the nullifier data structure. Further, the smart contract may verify the ZKPs. That is, for example, the smart contract may verify that (i) the hierarchical tree structure includes the transaction participant's commitment $Z_i$, where $Z_i$ is generated by the computation $Z_i = H(Pk_i \circledast S_i)$, (ii) $N_i$ is generated via an application of the hashing function H on the random nonce $S_i$ and the private identifier (e.g., private key) $Sk_i$ of the transaction participant 110*b*, 110*c* on the ZKP-enabled DLN 100, and/or (iii) $Sk_i$ is the private identifier (e.g., private key) of the transaction participant 110*b*, 110*c* on the ZKP-enabled DLN 100 that corresponds to the public key $Pk_i$. Upon verifying the ZKPs and that the nullifier N is not included in the nullifier data structure, the smart contract may add the nullifier into the nullifier data structure and increase by one the count or number of transaction participants that have indicated approval of the multi-party document to the smart contract. At 310, when the count or number of transaction participants that have indicated approval of the multi-party document to the smart contract equals the number of commitments provided to the smart contract by the multi-party document deployer 102*a*, in some embodiments, the smart contract may confirm that the multi-party document has received approval from all the transaction participants, and in some implementations, proceed with executing the multi-party document.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   generating, via a processor, a first commitment to facilitate an approval, by a first party of a plurality of parties, of a document to be approved by the plurality of parties on a zero-knowledge-proof (ZKP)-enabled distributed ledger-based network (DLN), the first commitment generated by hashing a first public identifier on the ZKP-enabled DLN of the first party and a first random nonce;
   generating, via the processor, a second commitment to facilitate the approval, by a second party of the plurality of parties, of the document to be approved by the plurality of parties on the ZKP-enabled DLN, the second commitment generated by hashing a second public identifier on the ZKP-enabled DLN of the second party and a second random nonce;
   generating, via the processor, a single hierarchical tree that includes the first commitment as a first leaf node of the single hierarchical tree and the second commitment as a second leaf node of the single hierarchical tree;
   providing, via the processor and to a self-executing code segment on the ZKP-enabled DLN, the first commitment, the second commitment, a hash of a content of the multi-party document and a root of the single hierarchical tree; and
   providing, via the processor, a duplicate of the content of the multi-party document to at least one of the first party or the second party.

2. The method of claim 1, wherein the hashing the first public identifier and/or the first random nonce includes hashing a result of an application of a combining operator on the first public identifier and the first random nonce.

3. The method of claim 1, wherein the hashing the first public identifier and/or the first random nonce includes hashing a result of an application of a combining operator on the first public identifier and the first random nonce, the combining operator being a concatenation operator.

4. The method of claim 1, wherein the single hierarchical tree is a Merkle tree.

5. The method of claim 1, wherein the first public identifier is a first public key of the first party on the ZKP-enabled DLN, and the second public identifier is a second public key of the second party on the ZKP-enabled DLN.

6. The method of claim 1, wherein (1) the providing the first commitment, the second commitment, the hash of the content of the multi-party document and/or the root of the single hierarchical tree and/or (2) the providing the duplicate of the content of the multi-party document, occur without an identity of the first party, the second party and/or the content of the multi-party document being revealed on the ZKP-enabled DLN.

7. A method, comprising:
   receiving, at a computing node of a distributed ledger-based network (DLN), a hierarchical tree structure that includes a commitment as a leaf node of the hierarchical tree structure, the commitment generated to facilitate an approval, by a party of a plurality of parties, of a document to be approved by the plurality of parties on the DLN, the commitment generated via a first application of a first hashing function on a public identifier on the DLN of the party and/or a random nonce;
   receiving, at the computing node, (1) a nullifier obtained via a second application of a second hashing function on the random nonce and a private identifier of the party, and (2) a zero-knowledge proof (ZKP) that:
      (a) the hierarchical tree structure includes the commitment as the leaf node;
      (b) the second application of the second hashing function includes the second application of the second hashing function on the random nonce; and/or
      (c) the private identifier and the public identifier are corresponding identifiers of an identifier pair that includes the private identifier and the public identifier on the DLN of the party; and
   adding the nullifier into a nullifier data structure on the DLN after verification of:
      (i) an absence of the nullifier from the nullifier data structure, and
      (ii) the ZKP by a self-executing code segment on the DLN.

8. The method of claim 7, wherein the ZKP that the hierarchical tree structure includes the commitment as the leaf node includes the ZKP that the commitment is obtained via the first application of the hashing function on the public identifier and/or the random nonce.

9. The method of claim 7, further comprising:
receiving, at the computing node, a first hash of a first content of the multi-party document,
the receiving the nullifier occurs after a comparison of the first hash of the first content of the multi-party document to a second hash of a second content of the multi-party document received by the party indicates that the first content and the second content are true duplicates of each other.

10. The method of claim 7, further comprising:
increasing a count of parties that approved the multi-party document by one after adding the nullifier into the nullifier data structure.

11. The method of claim 7, wherein the second application of the second hashing function on the random nonce and/or the private identifier includes the second application of the second hashing function on a result of an application of a combining operator on the random nonce and the private identifier.

12. The method of claim 7, wherein the second application of the second hashing function on the random nonce and/or the private identifier includes the second application of the second hashing function on a result of an application of a combining operator on the random nonce and the private identifier, the combining operator being a concatenation operator.

13. The method of claim 7, wherein the hierarchical tree structure is a Merkle tree.

14. The method of claim 7, wherein the public identifier is a public key of the party on the DLN.

15. The method of claim 7, wherein the private identifier is a private key of the party on the DLN.

16. The method of claim 7, wherein receiving the hierarchical tree structure and/or the receiving the nullifier occur without an identity of the party and/or the content of the multi-party document being revealed on the DLN.

17. A method, comprising:
receiving, at a computing node of a distributed ledger-based network (DLN), a hierarchical tree structure that includes a plurality of commitments as leaf nodes of the hierarchical tree structure, each commitment of the plurality of commitments generated via a first application of a first hashing function on a random nonce and a public identifier of a party that is from a plurality of parties and that is uniquely associated with that commitment, the hierarchical tree structure generated to facilitate an approval of a multi-party document by the plurality of parties;
receiving, at the computing node and from that party of the plurality of parties, (i) a nullifier obtained via a second application of a second hashing function on the random nonce and a secret identifier of that party, and (ii) a zero-knowledge proof (ZKP) that:
(a) the hierarchical tree structure includes the commitment for that party as one leaf node of the leaf nodes of the hierarchical tree structure;
(b) the second application of the second hashing function includes the second application of the second hashing function on the random nonce; and/or
(c) the secret identifier and the public identifier of that party are corresponding identifiers of an identifier pair that includes the secret identifier of that party and the public identifier on the DLN of that party;
adding the nullifier onto a nullifier data structure after verification of: (1) an absence of the nullifier from the nullifier data structure, and (2) the ZKP by a self-executing code segment on the DLN; and
generating a confirmation confirming approval of the multi-party document by each party of the plurality of parties after verifying that a total count of received nullifiers added onto the nullifier data structure equals a number of commitments in the plurality of commitments in the hierarchical tree structure.

18. The method of claim 17, wherein generating the confirmation occurs without an identity of each party from the plurality of parties and/or a content of the multi-party document being revealed on the DLN.

19. The method of claim 17, further comprising:
receiving, at the computing node, a first hash of a first content of the multi-party document,
the receiving the nullifier occurs after a comparison of the first hash of the first content of the multi-party document to a second hash of a second content of the multi-party document received by each party of the plurality of parties indicates that the first content and the second content are true duplicates of each other.

20. The method of claim 17, wherein the multi-party document is a legal contract.

* * * * *